US011328276B2

(12) United States Patent
Jain et al.

(10) Patent No.: US 11,328,276 B2
(45) Date of Patent: May 10, 2022

(54) ELECTRONIC SYSTEM AND METHOD FOR TRANSACTION PROCESSING

(71) Applicant: Mastercard International Incorporated, Purchase, NY (US)

(72) Inventors: Navneet Jain, Pune (IN); Ganesh Shinde, Pune (IN)

(73) Assignee: Mastercard International Incorporated, Purchase, NY (US)

(*) Notice: Subject to any disclaimer, the term of this patent is extended or adjusted under 35 U.S.C. 154(b) by 251 days.

(21) Appl. No.: 16/447,743

(22) Filed: Jun. 20, 2019

(65) Prior Publication Data
US 2019/0392411 A1 Dec. 26, 2019

(30) Foreign Application Priority Data

Jun. 21, 2018 (SG) .......................... 10201805348U

(51) Int. Cl.
*G06Q 30/02* (2012.01)
*G06Q 20/12* (2012.01)
*G06Q 20/34* (2012.01)

(52) U.S. Cl.
CPC .......... *G06Q 20/12* (2013.01); *G06Q 20/351* (2013.01); *G06Q 30/0222* (2013.01)

(58) Field of Classification Search
CPC ...... G06Q 30/02; G06Q 20/12; G06Q 20/351; G06Q 30/0207–30/0277
See application file for complete search history.

(56) References Cited

U.S. PATENT DOCUMENTS

| | | | |
|---|---|---|---|
| 9,082,119 B2* | 7/2015 | Ortiz | G06Q 20/40 |
| 9,704,161 B1* | 7/2017 | Oates | G06Q 20/00 |
| 9,972,027 B1* | 5/2018 | Tavares | G06Q 30/0246 |
| 10,152,699 B2* | 12/2018 | Muthukrishnan | G06Q 20/407 |
| 10,521,814 B1* | 12/2019 | Collins | G06Q 20/4012 |
| 10,943,247 B1* | 3/2021 | Spector | G06Q 30/0222 |

(Continued)

*Primary Examiner* — Thuy N Nguyen
(74) *Attorney, Agent, or Firm* — Hovey Williams LLP

(57) ABSTRACT

The present disclosure generally relates to an electronic system, a computerized method, and a non-transitory computer-readable storage medium comprising instructions for processing a transaction between a consumer and a merchant with a payment instrument of the consumer selected for the merchant. The system comprises a server configured for performing steps of the method comprising: receiving, from an acquirer financial institution for the merchant, details of the transaction and a common virtual payment token, the transaction details comprising details of the merchant; retrieving, from a consumer database, identification details of a set of consumer payment instruments associated with the common virtual payment token; selecting, from the set of consumer payment instruments, the consumer payment instrument for the merchant based on the merchant details; retrieving, from the consumer database, payment details of the selected consumer payment instrument; and processing the transaction with the selected consumer payment instrument, said transaction processing comprising communicating, to an issuer financial institution for the selected consumer payment instrument, the transaction details and the payment details of the selected consumer payment instrument.

16 Claims, 6 Drawing Sheets

(56) References Cited

U.S. PATENT DOCUMENTS

| | | | |
|---|---|---|---|
| 2011/0060629 A1* | 3/2011 | Yoder | G06Q 20/10 705/14.1 |
| 2012/0290376 A1* | 11/2012 | Dryer | G06Q 20/425 705/14.23 |
| 2014/0365363 A1* | 12/2014 | Knudsen | G06Q 20/3674 705/41 |
| 2015/0206107 A1* | 7/2015 | Chen | G06Q 20/204 705/39 |
| 2015/0235212 A1* | 8/2015 | Ortiz | G06Q 20/3278 705/44 |
| 2015/0254648 A1* | 9/2015 | Clements | G06Q 20/385 705/41 |
| 2015/0254664 A1* | 9/2015 | Bondesen | G06Q 20/3821 705/44 |
| 2015/0254698 A1* | 9/2015 | Bondesen | G06Q 20/20 705/14.17 |
| 2016/0012405 A1* | 1/2016 | Lynch | G06Q 20/386 705/16 |
| 2016/0019536 A1* | 1/2016 | Ortiz | G06Q 20/36 705/67 |
| 2016/0217459 A1* | 7/2016 | Lindner | G06Q 20/367 |
| 2016/0292668 A9* | 10/2016 | Laracey | G06Q 20/3276 |
| 2016/0335613 A1* | 11/2016 | Laracey | G06Q 20/102 |
| 2016/0335656 A1* | 11/2016 | Venugopalan | G06Q 20/3821 |
| 2016/0364938 A1* | 12/2016 | Miranda | G06Q 20/3263 |
| 2017/0017942 A1* | 1/2017 | Nix | G06Q 20/40 |
| 2017/0293901 A1* | 10/2017 | Savla | G06Q 20/387 |
| 2017/0323294 A1* | 11/2017 | Rohlfing | G06Q 20/3829 |
| 2018/0053242 A1* | 2/2018 | Agrawal | G06Q 20/12 |
| 2018/0150816 A1* | 5/2018 | Liu | G06Q 20/202 |
| 2018/0181963 A1* | 6/2018 | Birukov | G06Q 20/3274 |
| 2018/0197214 A1* | 7/2018 | Rokde | G06Q 30/04 |
| 2018/0253705 A1* | 9/2018 | Spector | G06Q 30/0207 |
| 2018/0308096 A1* | 10/2018 | Spector | G06Q 20/36 |
| 2018/0357629 A1* | 12/2018 | Maheshwari | G06Q 50/12 |
| 2019/0147515 A1* | 5/2019 | Hurley | G06Q 30/0613 705/44 |
| 2019/0251589 A1* | 8/2019 | VanFleet | G06Q 20/40 |
| 2019/0318345 A1* | 10/2019 | Kallugudde | G06Q 20/38215 |
| 2019/0392411 A1* | 12/2019 | Jain | G06Q 20/351 |
| 2020/0027083 A1* | 1/2020 | Patrni | G06Q 20/40 |
| 2020/0311710 A1* | 10/2020 | Laracey | G06Q 20/3226 |

\* cited by examiner

| Consumer Payment Instrument | Issuer Financial Institution | Merchant Identifiers | Merchant Category Codes |
|---|---|---|---|
| 16a – 5546 2222 3333 4444 | Citibank | Fuel | 5542, 5983 |
| 16b – 5289 3333 4444 5555 | HDFC Bank | Restaurant | 5812, 5814 |
| 16c – 5264 1111 2222 3333 | SBI | Retail, Flipkart | 5965, 5999, 5411 |
| 16d – 4384 4444 5555 6666 | HSBC Bank | Default | Others |

FIG. 3B

| Consumer Payment Instrument | Issuer Financial Institution | Merchant Identifiers | Merchant Category Codes | Virtual Payment Instrument Token | Common Virtual Payment Token |
|---|---|---|---|---|---|
| 16a – 5546 2222 3333 4444 | Citibank | Fuel | 5542, 5983 | 1111 2222 3333 4444 | 5403 1122 2233 3344 |
| 16b – 5289 3333 4444 5555 | HDFC Bank | Restaurant | 5812, 5814 | 2222 3333 4444 5555 | 5403 1122 2233 3344 |
| 16c – 5264 1111 2222 3333 | SBI | Retail, Flipkart | 5965, 5999, 5411 | 3333 4444 5555 6666 | 5403 1122 2233 3344 |
| 16d – 4384 4444 5555 6666 | HSBC Bank | Default | Others | 4444 5555 6666 7777 | 5403 1122 2233 3344 |

FIG. 3C

ELECTRONIC SYSTEM AND METHOD FOR TRANSACTION PROCESSING

CROSS REFERENCE TO RELATED APPLICATIONS

This application claims priority to Singaporean Application Serial No. 10201805348U, filed Jun. 21, 2018, which is incorporated herein by reference in its entirety

TECHNICAL FIELD

The present disclosure generally relates to an electronic system and method for processing a transaction between a consumer and a merchant. Particularly, the present disclosure describes various embodiments of an electronic system and method for processing the transaction, e.g. an online or retail transaction, with a payment instrument of the consumer selected for the merchant.

BACKGROUND

Consumers often own multiple payment instruments, e.g. credit cards and debit cards, to cater to their varying spending needs. For example, consumers prefer to use certain credit cards of certain issuer banks for transactions with certain merchants due to promotional offers arranged between the merchants and the issuer banks. These promotional offers may include rewards, rebates, and discounts. Consumers may also prefer using different credit cards for different types of purchases, possibly for ease of tracking their spending. For example, consumers may use a Citibank credit card for purchasing petrol, SBI credit card for retail purchases, and HDFC® credit card for transactions at restaurants. A consumer holding multiple payment instruments will need to carry most, if not all, the payment instruments whenever he/she is outside, because he/she is unlikely to be able to predict the types of transactions he/she will make throughout the day. The consumer will also need to remember which payment instruments have promotional offers for which merchants. The consumer may end up using a payment instrument for transacting with a merchant that has no promotional offer compared to another payment instrument the consumer has on hand.

Therefore, in order to address or alleviate at least one of the aforementioned problems and/or disadvantages, there is a need to provide an improved electronic system and method for transaction processing.

SUMMARY

According to an aspect of the present disclosure, there is an electronic system, a computerized method, and a non-transitory computer-readable storage medium comprising instructions for processing a transaction between a consumer and a merchant with a payment instrument of the consumer selected for the merchant. The system comprises a server configured for performing steps of the method comprising: receiving, from an acquirer financial institution for the merchant, details of the transaction and a common virtual payment token, the transaction details comprising details of the merchant; retrieving, from a consumer database, identification details of a set of consumer payment instruments associated with the common virtual payment token; selecting, from the set of consumer payment instruments, the consumer payment instrument for the merchant based on the merchant details; retrieving, from the consumer database, payment details of the selected consumer payment instrument; and processing the transaction with the selected consumer payment instrument, said transaction processing comprising communicating, to an issuer financial institution for the selected consumer payment instrument, the transaction details and the payment details of the selected consumer payment instrument.

An electronic system and method for transaction processing according to the present disclosure are thus disclosed herein. Various features, aspects, and advantages of the present disclosure will become more apparent from the following detailed description of the embodiments of the present disclosure, by way of non-limiting examples only, along with the accompanying drawings.

BRIEF DESCRIPTION OF THE DRAWINGS

FIG. 3B is a table exemplifying registration details from the consumer registration procedure, in accordance with embodiments of the present disclosure.

FIG. 3C is another table exemplifying registration details from the consumer registration procedure, in accordance with embodiments of the present disclosure.

DETAILED DESCRIPTION

In the present disclosure, depiction of a given element or consideration or use of a particular element number in a particular figure or a reference thereto in corresponding descriptive material can encompass the same, an equivalent, or an analogous element or element number identified in another figure or descriptive material associated therewith. The use of "/" in a figure or associated text is understood to mean "and/or" unless otherwise indicated. For purposes of brevity and clarity, descriptions of embodiments of the present disclosure are directed to an electronic system and method for transaction processing, in accordance with the drawings. While aspects of the present disclosure will be described in conjunction with the embodiments provided herein, it will be understood that they are not intended to limit the present disclosure to these embodiments. On the contrary, the present disclosure is intended to cover alternatives, modifications and equivalents to the embodiments described herein, which are included within the scope of the present disclosure as defined by the appended claims. Furthermore, in the following detailed description, specific details are set forth in order to provide a thorough understanding of the present disclosure. However, it will be recognized by an individual having ordinary skill in the art, i.e. a skilled person, that the present disclosure may be practiced without specific details, and/or with multiple details arising from combinations of aspects of particular embodiments. In a number of instances, known systems, methods, procedures, and components have not been described in detail so as to not unnecessarily obscure aspects of the embodiments of the present disclosure.

Overview

Figure 1:
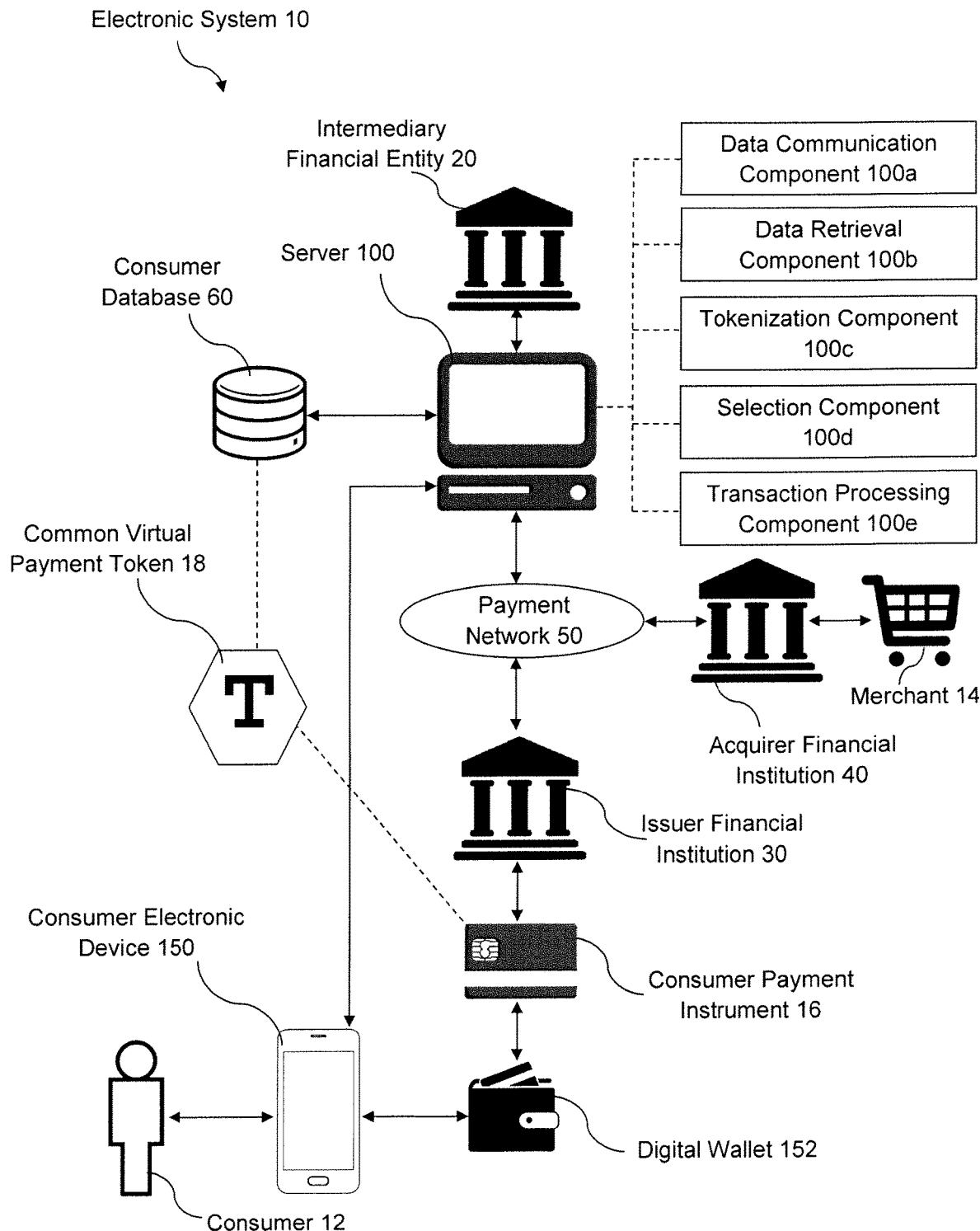
FIG. 1 is an illustration of an electronic system for transaction processing, in accordance with embodiments of the present disclosure.

In representative or exemplary embodiments of the present disclosure, there is an electronic system 10 for processing a transaction between a consumer 12 and a merchant 14 with a payment instrument 16 of the consumer 12 selected for the merchant 14, as illustrated in FIG. 1. The system 10 includes an intermediary financial entity 20, one or more issuer financial institutions 30, and one or more acquirer financial institutions 40. The system 10 further includes a server 100 operated by the intermediary financial entity 20. The system 10 further includes a payment network 50 communicatively connecting or linking the intermediary financial entity 20, issuer financial institutions 30, and acquirer financial institutions 40 to one another. Particularly, each of the issuer financial institutions 30 and acquirer financial institutions 40 operates its own computer processors/servers that are communicatively linked to the server 100 via the payment network 50. The payment network 50 may be operated by a payment network operator, such as Mastercard® or Visa®.

The system 10 includes an electronic device 150 of the consumer 12. A mobile application is executable on the consumer electronic device 150 to operate a digital wallet 152. The digital wallet 152 is linked to one or more payment instruments 16 of the consumer 12, such that transactions made using the digital wallet 152 are paid with the consumer payment instruments 16. A consumer payment instrument 16 is issued by an issuer financial institution 40 and which the consumer 12 may use to pay for transactions. As will be described in more detail below, the digital wallet 152 is linked to a common virtual payment token 18 that is associated, by the consumer 12, with one or more consumer payment instruments 16. The system 10 further includes a consumer database 60 storing details of consumer payment instruments 16 and common virtual payment tokens 18.

Figure 2:
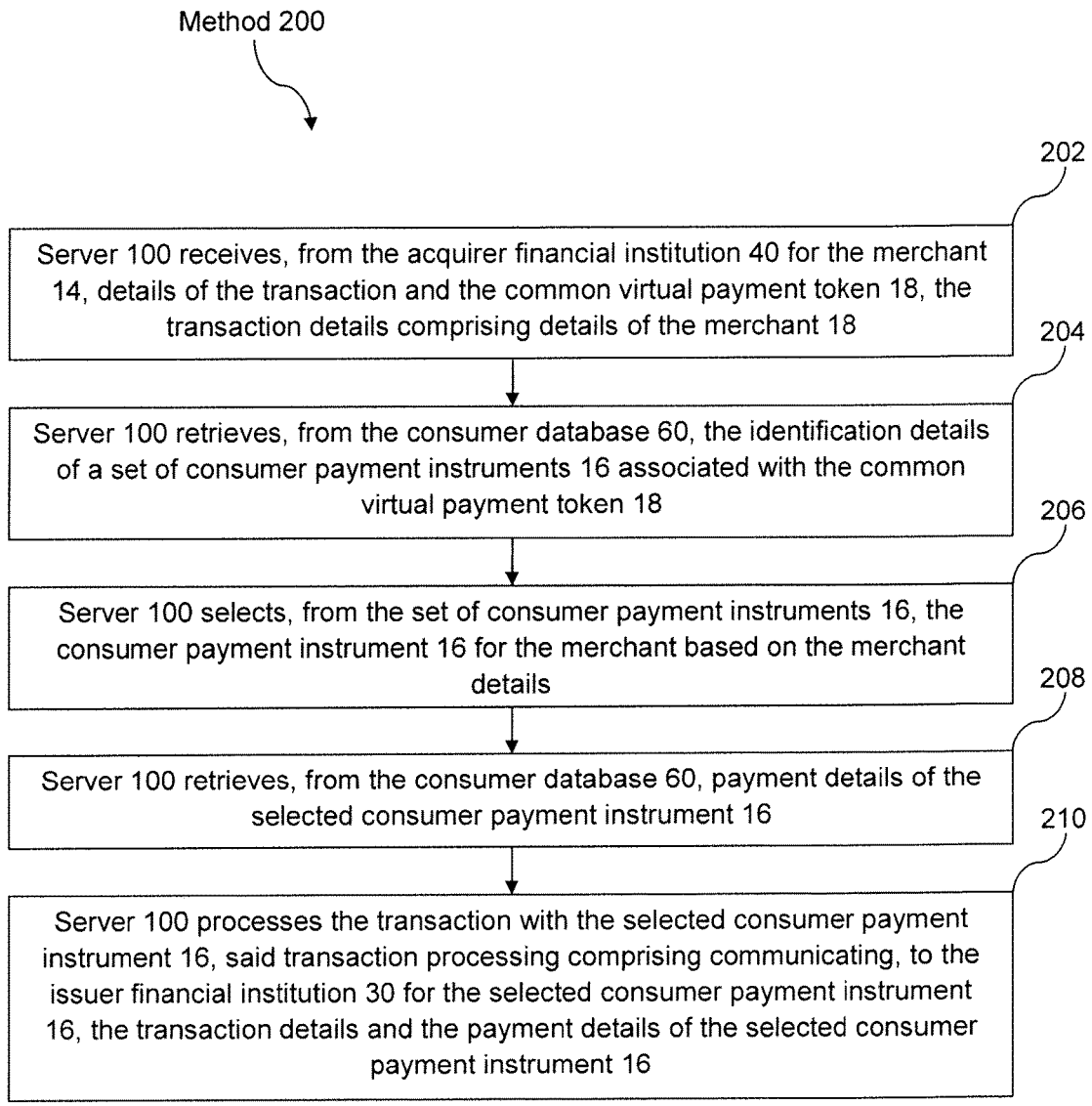
FIG. 2 is a flowchart illustration of a computerized method performed on a server for transaction processing, in accordance with embodiments of the present disclosure.

Further with reference to FIG. 2, there is shown a computer-implemented or computerized method 200 implemented on the server 100 for processing a transaction between a consumer 12 and a merchant 14. The consumer 12 activates the digital wallet 152 on the consumer electronic device 150 to pay for the transaction with the merchant 14. Specifically, the consumer electronic device 150 is communicable with a merchant billing machine or point-of-sale (POS) terminal of the merchant 14. Instead of details of a consumer payment instrument 16, the consumer electronic device 150 communicates a common virtual payment token 18 that is stored on the digital wallet 152. The merchant POS terminal then communicates the common virtual payment token, together with details of the transaction, to the acquirer financial institution 40 for the merchant 14.

In a step 202 of the method 200, a data communication component/module 100a of the server 100 receives, from the acquirer financial institution 40, the transaction details and the common virtual payment token. The transaction details include the transaction amount and details of the merchant 14, such as merchant identifier and/or merchant category codes. In a step 204, a data retrieval component/module 100b of the server 100 retrieves, from the consumer database 60, identification details of a set of consumer payment instruments 16 associated with the common virtual payment token 18.

Using the digital wallet 152, the set of consumer payment instruments 16 is selected by the consumer 12 and associated with the common virtual payment token 18. A tokenization component/module 100c of the server 100 tokenizes the consumer payment instruments 16 and generates the common virtual payment token 18. Various conditions are also determined by the consumer 12 such that each consumer payment instrument 16 is useable for specific merchant(s) 14. In a step 206, a selection component/module 100d of the server 100 selects, from the set of consumer payment instruments 16, the consumer payment instrument 16 for the merchant 14 based on the merchant details. For example, the selected consumer payment instrument 16 is useable for merchants 14 with specific merchant category codes, and the merchant 14 in this transaction satisfies this condition.

In a step 208, the data retrieval component 100b retrieves, from the consumer database 60, payment details of the selected consumer payment instrument 16. In a step 210, a transaction processing component/module 100e of the server 100 processes the transaction with the selected consumer payment instrument 16. Specifically, in the step 210, the server 100 communicates, to the issuer financial institution 30 for the selected consumer payment instrument 16, the transaction details and the payment details of the selected consumer payment instrument 16. It will be appreciated that transaction is subsequently processed by the issuer financial institution 30 and through the payment network 50 in a standard manner readily understood by the skilled person.

Therefore, with the system 10 and method 200, the consumer 12 can conveniently use different consumer payment instruments 16 for transactions with different merchants 14. Furthermore, the consumer 12 does not have to carry multiple payment instruments 16 whenever he/she is outside, since the payment instruments 16 can be associated with a common virtual payment token 18 that is linked to the digital wallet 152.

DESCRIPTION OF EMBODIMENTS

In various embodiments of the present disclosure, the electronic system 10 includes the intermediary financial entity 20 operating the server 100, one or more issuer financial institutions 30 operating one or more issuer servers, and one or more acquirer financial institutions 40 operating one or more acquirer servers. The server 100 includes a processor, a data storage device or memory configured to store computer-readable instructions for processing thereby, and a data communication component/module 100a for communicating with one or more other data communication components and/or computing systems/servers. It will be appreciated that an issuer financial institution 30 issues payment instruments 16, e.g. credit cards, to consumers 12 who are customers of the issuer financial institution 30.

The system 10 is configured for processing a transaction between a consumer 12 and a merchant 14 with a consumer payment instrument 16 selected for the merchant 14. The term "payment instrument" may refer to any suitable cashless payment mechanism, such as payment cards. The term "payment card" may refer to a credit card, debit card, or charge card which the consumer may use to pay for transactions. In addition to payment cards, the payment instruments 16 may include, but are not limited to, membership cards, promotional cards, frequent flyer cards, identification cards, gift cards, and/or any other payment cards that may hold payment card information and which may be stored electronically, such as on the digital wallet 152 of the consumer electronic device 150.

The consumer electronic device 150 may be a mobile device, such as mobile phone, smartphone, personal digital assistant (PDA), tablet, laptop, or computer. As described above, there is a mobile application that is executable on the consumer electronic device 150 to operate the digital wallet 152. The mobile application communicates/cooperates with a host application of the digital wallet 152. The mobile application provides a user interface accessible by the consumer 12 with the consumer electronic device 150 to operate the digital wallet 152. In one embodiment, the digital wallet 152 is provided by the intermediary financial entity 20, and the host application is stored on the server 100 or on a separate cloud computing system communicatively linked to the server 100. For example, the host application is provided by Mastercard® in the form of the Mastercard Digital Enablement Service (MDES). In another embodiment, the digital wallet 152 is provided by an issuer financial institution 30, and the host application is stored on a server or computing system thereof that is communicable with the server 100. In another embodiment, the digital wallet 152 is provided by third party service provider, and the host application is stored on a server or computing system thereof that is communicable with the server 100.

Figure 3A:
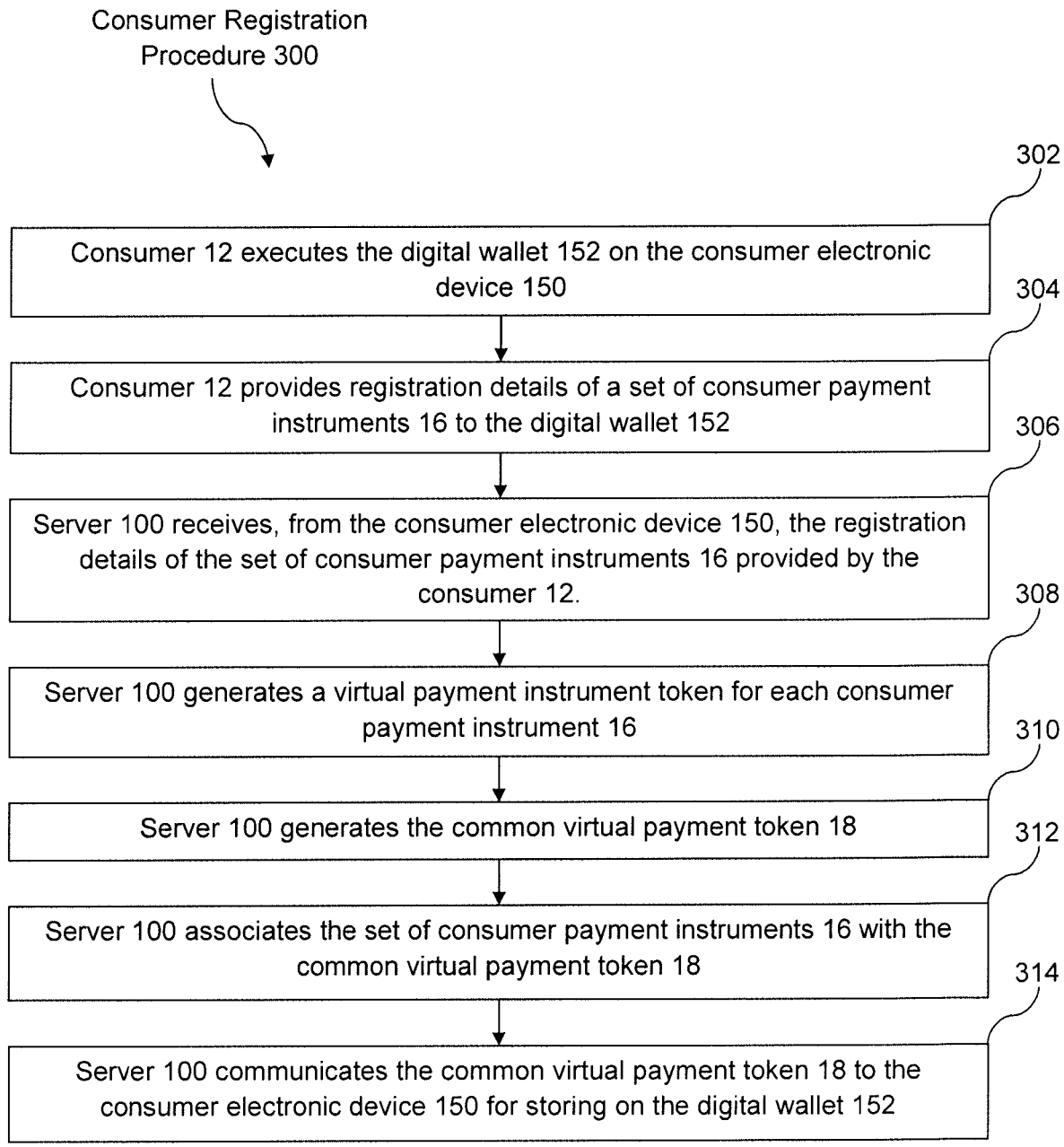
FIG. 3A is a flowchart illustration of a consumer registration procedure, in accordance with embodiments of the present disclosure.

The consumer 12 may first enroll or register with the intermediary financial entity 20 via the digital wallet 152 to tokenize the consumer payment instruments 16. FIG. 3A illustrates a consumer registration procedure or method 300 for tokenizing the consumer payment instruments 16. In a step 302, the consumer 12 executes the digital wallet 152 on the consumer electronic device 150. In a step 304, the consumer 12 provides registration details of a set of consumer payment instruments 16 to the digital wallet 152. In many embodiments, the consumer payment instruments 16 are credit cards and the registration details include payment details that enable processing of payments from the consumer payment instruments 16.

For example, the registration details include the names of the issuer financial institutions 30, credit card numbers, expiry dates, credit card security codes, and names on the credit cards. The registration details further include at least one merchant identifier and/or at least one merchant category code for each consumer payment instrument 16. The merchant identifiers may relate to the type of establishment of the merchant (e.g. restaurant or retail) restaurant and/or the name of the merchant (e.g. Flipkart). For example, the consumer 12 may prefer one consumer payment instrument 16 for purchasing fuel and another consumer payment instrument 16 for retail shopping. The consumer 12 may also choose a default consumer payment instrument 16 for transactions with merchants 14 that do not belong to any of the other merchant identifiers and/or merchant category codes.

In some embodiments, the consumer 12 does not know the exact merchant identifiers and/or merchant category codes acceptable in the consumer registration procedure 300. To address this, the consumer registration procedure 300 includes a step wherein the server 100 communicates, to the consumer electronic device 150, a plurality of merchant identifiers and/or merchant category codes for selection by the consumer 12. Specifically, the consumer 12 will be able to allocate the merchant identifiers and/or merchant category codes to the consumer payment instruments 16 in the registration details.

FIG. 3B illustrates a table exemplifying registration details of the consumer payment instruments 16*a*-*d*, such as credit cards. It can be seen that each consumer payment instrument 16 is associated with a set of merchant identifiers and/or merchant category codes, and is selectable based on the merchant identifiers and/or merchant category codes. In one example as shown in FIG. 3B, a first consumer payment instrument 16*a* is a credit card issued by Citibank. The first consumer payment instrument 16*a* will be selected for transactions with a first set of the merchants 14 that are fuel-related, such as gas stations. The first set of merchants 14 correspond to a first set of merchant identifiers and/or merchant category codes for fuel, such as 5542 (Automated Fuel Dispensers) and 5983 (Fuel Dealers (Non-Automotive)). In another example as shown in FIG. 3B, a second consumer payment instrument 16*b* is a credit card issued by HDFC Bank. The second consumer payment instrument 16*b* will be selected for transactions with a second set of the merchants 14 for restaurants. The second set of merchants 14 correspond to a second set of merchant identifiers and/or merchant category codes for restaurants, such as 5812 (Eating Places, Restaurants) and 5814 (Fast Food Restaurants). In yet another example as shown in FIG. 3B, a default consumer payment instrument 16*d*, which is a credit card issued by HSBC Bank, will be selected for transactions with merchants 14 that do not belong to any of the other merchant identifiers and/or merchant category codes. It will be appreciated that the merchant category codes are in accordance with the ISO 8583 standard.

In a step 306, the server 100 receives, from the consumer electronic device 150, the registration details of the set of consumer payment instruments 16 provided by the consumer 12. The registration details are stored on the consumer database 60. The consumer database 60 may reside locally on the server 100, or alternatively on a remote server or computer communicatively linked to the server 100.

In some embodiments, there is a step 308 wherein the tokenization component 100*c* of the server 100 generates a virtual payment instrument token for each consumer payment instrument 16. Tokenization of the consumer payment instruments 16 replaces sensitive data of the consumer payment instruments 16 with secure surrogate data in the form of the tokens. The virtual payment instrument tokens may be referred to as the first virtual tokens that are unique to each consumer payment instrument 16. In a step 310, the server 100 generates the common virtual payment token 18. In a step 312, the server 100 associates the set of consumer payment instruments 16 with the common virtual payment token 18. The common virtual payment token 18 may thus be referred to as the second virtual token that is common to or shared among all the consumer payment instruments 16 provided by the consumer 12. FIG. 3C illustrates a table exemplifying details of the tokens, which are also stored on the consumer database 60.

In a step 314, the server 100 communicates the common virtual payment token 18 to the consumer electronic device 150 for storing on the digital wallet 152. Optionally, the server 100 also communicates the virtual payment instrument tokens to the consumer electronic device 150. The consumer 12 will be able to view registration details of the consumer payment instruments 16 as well as details of the tokens via the digital wallet 152. Furthermore, the consumer 12 may update the set of consumer payment instruments 16, such as to revise the merchant identifiers and merchant category codes, as well as to remove or add consumer payment instruments 16.

Figure 4:
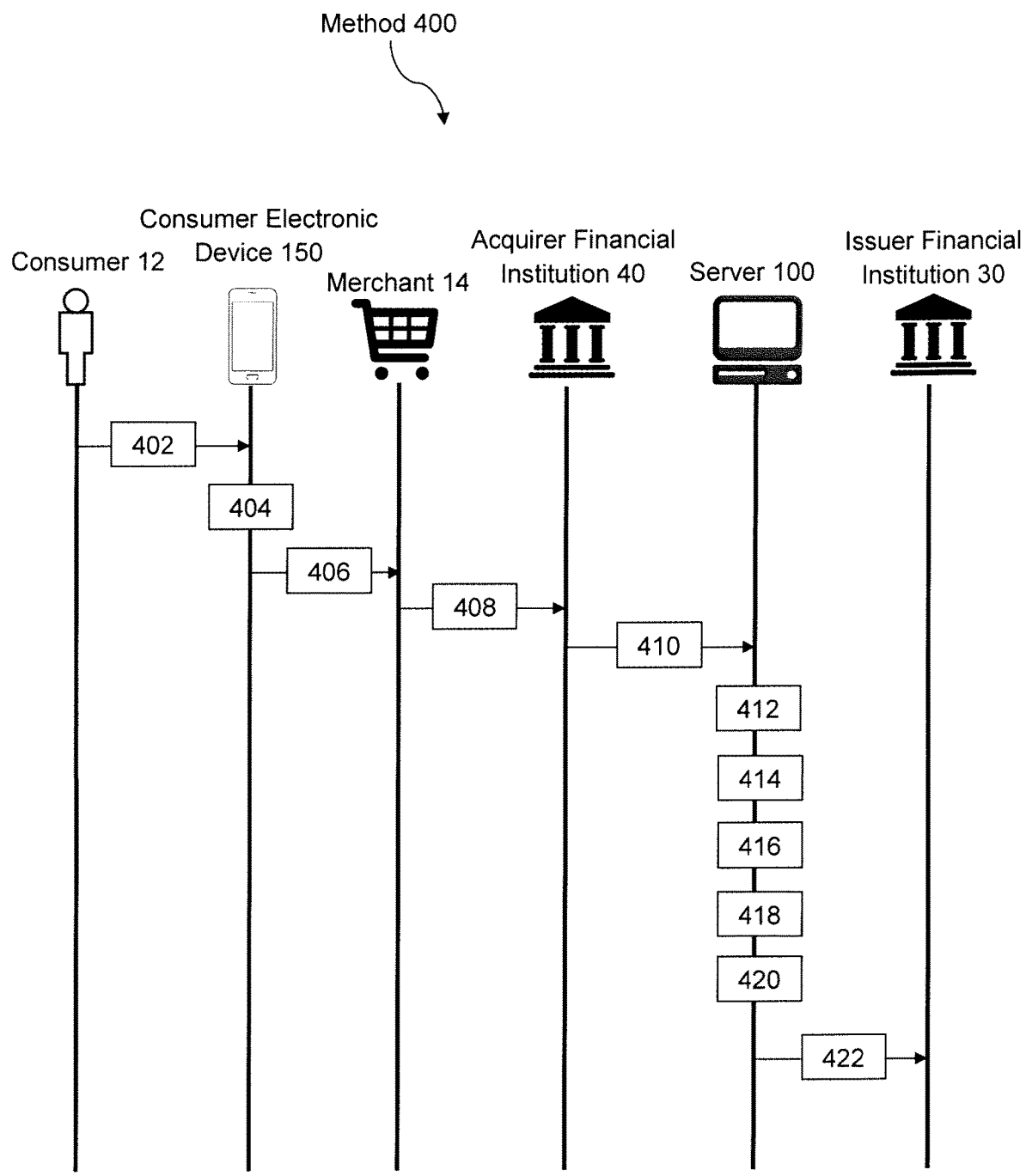
FIG. 4 is a schematic illustration of a computerized method for transaction processing, in accordance with embodiments of the present disclosure.

In various embodiments with reference to FIG. 4, there is a computer-implemented or computerized method 400 implemented on the system 10 for processing a transaction between the consumer 12 and a merchant 14. For example, the merchant 14 is a retail shop and the consumer 12 is making payment for purchases at the retail shop. In a step 402, the consumer 12 executes the mobile application on the consumer electronic device 150 to activate the digital wallet 152. Instead of selecting any particular consumer payment instrument 16 to make payment, the consumer 12, in a step 404, selects the common virtual payment token 18 stored on the digital wallet 152. In a step 406, the consumer electronic device 150 communicates the common virtual payment token 18 to the merchant 14. In one embodiment, the merchant 14 operates a merchant billing machine or POS terminal at the merchant premises and which is communicable with the consumer electronic device 150. Communication between the consumer electronic device 150 and merchant POS terminal may occur via standard communication protocols, such as near field communication (NFC). The common virtual payment token 18 is subsequently communicated from the merchant POS terminal to a merchant server or computing system.

In a step 408, the merchant 14 communicates, through the payment network 50 to the acquirer financial institution 40 for the merchant 14, details of the transaction and the common virtual payment token 18. Specifically, the merchant server communicates the transaction details and common virtual payment token 18 to a computer processor/server of the acquirer financial institution 40.

In a step 410, the acquirer financial institution 40 communicates, to the server 100, the transaction details and common virtual payment token 18. In accordance with the ISO 8583 standard, the transaction details include the transaction amount and details of the merchant 14. The merchant details include an identifier and one or more merchant category codes of the merchant 14. Furthermore, the transaction details include a data element indicating that a virtual token, i.e. the common virtual payment token 18, is provided instead of a real payment instrument 16 like a credit card for payment of the transaction. The data element informs the intermediary financial entity 20 that the common virtual payment token 18 is to be mapped to the consumer payment instruments 16 associated therewith, as further described below.

In a step 412, the server 100 searches the consumer database 60 to identify the common virtual payment token 18. Upon identification, in a step 414, the data retrieval component 100b of the server 100 retrieves, from the consumer database 60, identification details of the set of consumer payment instruments 16 associated with the common virtual payment token 18. The identification details include identifiers of each consumer payment instrument 16, such as the virtual payment instrument tokens or first virtual tokens, as well as the merchant identifiers and/or merchant category codes for each consumer payment instrument 16.

In a step 416, the selection component 100d of the server 100 selects, from the set of consumer payment instruments 16, the consumer payment instrument 16 for the merchant 14 based on the merchant details. Different consumer payment instruments 16 are selected for transactions at different merchants with different merchant identifiers and/or merchant category codes. A first consumer payment instrument 16 linked to the common virtual payment token 18 is selected for a first merchant 14 having a first merchant identifier and a first set of merchant category codes. A second consumer payment instrument 16 linked to the common virtual payment token 18 is selected is selected for a second merchant 14 having a second merchant identifier and a second set of merchant category codes.

For example, the transaction occurs at a gas station and the consumer 12 is purchasing fuel from the merchant 14 operating the gas station. The merchant details will indicate that the merchant supplies fuel (i.e. is fuel-related) and include the merchant category codes 5542 and/or 5983. Based on the merchant details and the details of the set of consumer payment instruments 16 as shown in FIG. 3C, the first consumer payment instrument 16, which is the Citibank credit card, is selected as the merchant details satisfy the conditions configured for the first consumer payment instrument 16a. Accordingly, in the step 416, the first consumer payment instrument 16a is selected for payment of the transaction. In another example, the transaction occurs at a restaurant and the merchant category code is 5812 (Eating Places, Restaurants). The second consumer payment instrument 16b, which is the HDFC Bank credit card, is selected as the merchant details satisfy the conditions configured for the HDFC Bank credit card. Accordingly, in the step 416, the second consumer payment instrument 16b is selected for payment of the transaction.

In a step 418, the data retrieval component 100b of the server 100 retrieves, from the consumer database 60, payment details of the selected consumer payment instrument 16. The payment details refer to real details of the selected consumer payment instrument 16 for processing payments from the selected consumer payment instrument 16. For example, if the selected consumer payment instrument 16 is a credit card, the details include the credit card number, expiry date, security code, and name of the credit card owner, i.e. the consumer 12. It will be appreciated that payment details of the selected consumer payment instrument 16 are in accordance with the ISO 8583 standard such that payment for the transaction can be processed through the payment network 50 subsequently.

In a step 420, the transaction processing component 100e of the server 100 begins processing the transaction with the selected consumer payment instrument 16. Said transaction processing includes a step 422 of communicating a payment transaction request through the payment network 50 to the issuer financial institution 30 for the selected consumer payment instrument 16. The payment transaction request is for transferring the transaction amount from the selected consumer payment instrument 16 to a financial account of the merchant 14, such as a bank account held at the acquirer financial institution 40. The payment transaction request includes the transaction details and the payment details of the selected consumer payment instrument 16.

Subsequently, the issuer financial institution 30 communicates with the payment network 50 to process the transaction to transfer the transaction amount. It will be appreciated that the payment network 50 processes the transaction across the issuer financial institution 30 and acquirer financial institution 40 in a standard manner readily known to the skilled person.

In some embodiments, issuer financial institutions 30 may collaborate with merchants 14 to provide promotional offers to consumers 12. In one example, Flipkart may offer a 10% discount off on Big Billion Day if transactions are paid with a consumer payment instrument 16 issued by Citibank. In another example, Citibank may offer a 2% cash rebate for all transactions with merchants 14 using Citibank's payment instruments 16 during a predefined duration or time period, such as the Christmas holiday season.

The issuer financial institutions 30 communicate with the intermediary financial entity 20 to provide details of the promotional offers. Specifically, the server 100 receives, from one or more issuer financial institutions 30, details of one or more promotional offers agreed with the issuer financial institutions 30. The details of each promotional offer may include a duration of the promotional offer and/or details of eligible merchants 14 in the promotional offer. In one example, the Big Billion Day promotional offer by Citibank has Flipkart as an eligible merchant 14 and the duration follows that of the Big Billion Day. In another example, the promotional offer of cash rebate by Citibank has the duration following the Christmas holiday season, such as from 1 to 31 December. In yet another example, the promotional offer does not have any duration, i.e. is ongoing until termination by the merchant 14 or issuer financial institution 30.

The server 100 then updates the consumer database 60 with the details of the promotional offers. It will be appreciated that such updating is dynamic in nature as and when an issuer financial institution 30 communicates promotional offer details with the intermediary financial entity 20. After updating the consumer database 60, the server 100 communicates an update message to the consumer electronic device 150 to inform the consumer 12 that there are updates to the promotional offers. The consumer 12 will be able to retrieve details of the promotional offers for his/her payment instruments 16 using the digital wallet 152. Based on the promotional offer details, the consumer 12 may prefer to use different payment instruments 16 for the various merchants 14.

Referring to the Big Billion Day example, if the consumer 12 knows that he/she will be making purchases with Flipkart, the consumer 12 may allocate the first consumer payment instrument 16a, which is the Citibank credit card, as the preferred payment instrument 16 for transactions with Flipkart. In another example, if Citibank is offering a 2% cash rebate for all transactions, the consumer 12 may change the default payment instrument 16d to the first consumer payment instrument 16a or Citibank credit card. The consumer 12 may even choose to use the first consumer payment instrument 16a for all transactions with all merchants 14. It will be appreciated that the payment instruments 16 of the consumer 12 can be rearranged to the various merchants 14 according to the consumer's preferences and under consideration of the promotional offers.

In some embodiments, issuer financial institutions 30 may collaborate with merchants 14 to provide promotional offers to consumers 12. Furthermore, only a selection of consumer payment instruments 16 issued by the issuer financial institutions 30 are eligible for the promotional offers. For example, Citibank may offer a 2% cash rebate for all transactions with merchants 14 using Citibank's Citi Cash Back Card during a predefined duration. The selection of consumer payment instruments 16 may be further narrowed to a selection of consumers 12 instead of all the consumers 12 who has the Citi Cash Back Card. For example, the selection may be narrowed based on the credit scores of he consumers 12. Consumers 12 with credit scores below a predefined threshold will not be eligible for the promotional offer, even though they may have the Citi Cash Back Card.

Similarly, the issuer financial institutions 30 communicate with the intermediary financial entity 20 to provide details of the promotional offers. The details of each promotional offer may include at least one of a duration of the promotional offer, details of eligible merchants 14 in the promotional offer, and details of eligible consumer payment instruments 16. Following the previous example, details of eligible consumer payment instruments 16 include credit card details of all or a selection of the Citi Cash Back Cards issued by Citibank.

The server 100 verifies the details of eligible consumer payment instruments 16 against the consumer database 60. Specifically, the server 100 verifies whether the eligible consumer payment instruments 16 are already stored on the consumer database 60, and identifies the consumers 12 who are eligible for the promotional offers. The server 100 then updates the consumer database 60 with the details of the promotional offers for these eligible consumer payment instruments 16 and eligible consumers 12. After updating the consumer database 60, the server 100 communicates an update message to the eligible consumers 12 that there are updates to the promotional offers. The eligible consumers 12 will be able to retrieve details of the promotional offers for his/her payment instruments 16 using the digital wallet 152. Based on the promotional offer details, the eligible consumers 12 may prefer to use different eligible payment instruments 16 for the various eligible merchants 14.

Therefore, by using the method 400 as described in various embodiments herein, the consumer 12 can conveniently use different consumer payment instruments 16 for transactions with different merchants 14, such as to maximize reward benefits offered by the issuer financial institutions 30 for the consumer payment instruments 16. Furthermore, the consumer 12 does not have to carry multiple payment instruments 16 whenever he/she is outside, since the payment instruments 16 can be associated with a common virtual payment token 18 that is linked to the digital wallet 152. The consumer 12 can conveniently activate the digital wallet 152 on the consumer electronic device 150 to transact with merchants 14.

Technical Architecture

Figure 5:
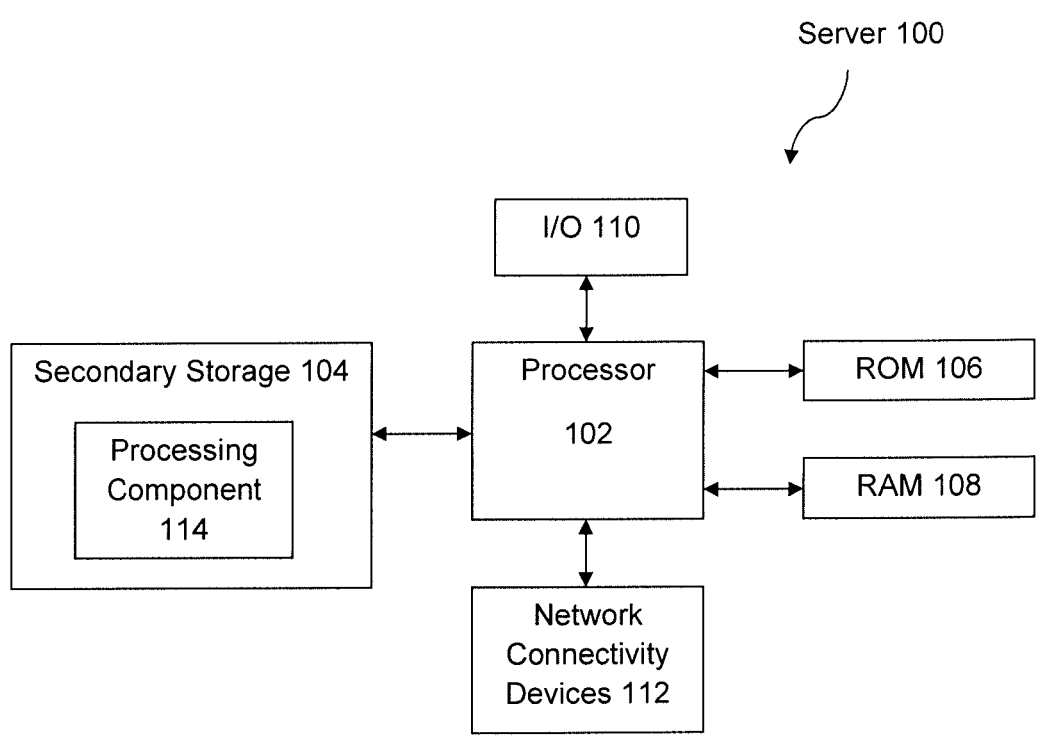
FIG. 5 is a block diagram illustration of the technical architecture of the server, in accordance with embodiments of the present disclosure.

The following is a description of the technical architecture of the server 100 with reference to FIG. 5.

The technical architecture of the server 100 includes a processor 102 (also referred to as a central processor unit or CPU) that is in communication with memory devices including secondary storage 104 (such as disk drives or memory cards), read only memory (ROM) 106, and random access memory (RAM) 108. The processor 102 may be implemented as one or more CPU chips. Various modules or components for performing various operations or steps of the methods 200/300/400 are configured as part of the processor 102 and such operations or steps are performed in response to non-transitory instructions operative or executed by the processor 102.

The technical architecture further includes input/output (I/O) devices 110, and network connectivity devices 112. The secondary storage 104 typically includes a memory card or other storage device and is used for non-volatile storage of data and as an over-flow data storage device if RAM 108 is not large enough to hold all working data. Secondary storage 104 may be used to store programs which are loaded into RAM 108 when such programs are selected for execution.

The secondary storage 104 has a processing component 114, including non-transitory instructions operative by the processor 102 to perform various operations or steps of the methods 200/300/400 according to various embodiments of the present disclosure. The ROM 106 is used to store instructions and perhaps data which are read during program execution. The secondary storage 104, the ROM 106, and/or the RAM 108 may be referred to in some contexts as computer-readable storage media and/or non-transitory computer-readable media. Non-transitory computer-readable media include all computer-readable media, with the sole exception being a transitory propagating signal per se.

The I/O devices 110 may include printers, video monitors, liquid crystal displays (LCDs), plasma displays, touch screen displays, keyboards, keypads, switches, dials, mice, track balls, voice recognizers, card readers, paper tape readers, and/or other known input devices.

The network connectivity devices 112 may take the form of modems, modem banks, Ethernet cards, universal serial bus (USB) interface cards, serial interfaces, token ring cards, fibre distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communication (NFC), radio frequency identity (RFID), and/or other air interface protocol radio transceiver cards, and other known network devices. These network connectivity devices 112 may enable the processor 102 to communicate with the Internet or one or more intranets. With such a network connection, it is contemplated that the processor 102 might receive information from the network, or might output information to the network in the course of performing the operations or steps of the methods 200/300/400. Such information, which is often represented as a sequence of instructions to be executed using processor 102, may be received from and outputted to the network, for example, in the form of a computer data signal embodied in a carrier wave.

The processor 102 executes instructions, codes, computer programs, scripts which it accesses from hard disk, floppy disk, optical disk (these various disk based systems may all be considered secondary storage 104), flash drive, ROM 106, RAM 108, or the network connectivity devices 112. While only one processor 102 is shown, multiple processors may be present. Thus, while instructions may be discussed as executed by a processor, the instructions may be executed simultaneously, serially, or otherwise executed by one or multiple processors.

It will be appreciated that the technical architecture of the server 100 may be formed by one computer, or multiple computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the multiple computers. In an embodiment, virtualization software may be employed by the technical architecture to provide the functionality of a number of servers that is not directly bound to the number of computers in the technical architecture. In an embodiment, the functionality disclosed above may be provided by executing the application and/or applications in a cloud computing environment. Cloud computing may include providing computing services via a network connection using dynamically scalable computing resources. A cloud computing environment may be established by an enterprise and/or may be hired on an as-needed basis from a third party provider.

It is understood that by programming and/or loading executable instructions onto the technical architecture of the server 100, at least one of the CPU 102, the ROM 106, and the RAM 108 are changed, transforming the technical architecture in part into a specific purpose machine or apparatus having the functionality as taught by various embodiments of the present disclosure. It is fundamental to the electrical engineering and software engineering arts that functionality that can be implemented by loading executable software into a computer can be converted to a hardware implementation by known design rules.

In the foregoing detailed description, embodiments of the present disclosure in relation to an electronic system and method for transaction processing are described with reference to the provided figures. The description of the various embodiments herein is not intended to call out or be limited only to specific or particular representations of the present disclosure, but merely to illustrate non-limiting examples of the present disclosure. The present disclosure serves to address at least one of the mentioned problems and issues associated with the prior art. Although only some embodiments of the present disclosure are disclosed herein, it will be apparent to a person having ordinary skill in the art in view of this disclosure that a variety of changes and/or modifications can be made to the disclosed embodiments without departing from the scope of the present disclosure. Therefore, the scope of the disclosure as well as the scope of the following claims is not limited to embodiments described herein.

The invention claimed is:

1. An electronic system comprising a server and a consumer database coupled in communication with the server, the server configured for performing steps comprising:
  communicating, to a consumer electronic device, one or more of a set of selectable merchant identifiers and a set of selectable merchant category codes;
  receiving, from the consumer electronic device, registration details of a set of consumer payment instruments, the registration details including, for each respective consumer payment instrument of the set of consumer payment instruments, payment details for the respective consumer payment instrument and a selection of one or more of the selectable merchant identifiers and the selectable merchant category codes to be associated with the respective consumer payment instrument;
  generating, by a tokenization component of the server, a set of unique first virtual tokens respectively for the set of consumer payment instruments;
  creating a table on the consumer database;
  storing the registration details and the set of unique first virtual tokens in the table on the consumer database by linking each of the respective consumer payment instruments with a respective one of the unique first virtual tokens, wherein the registration details and the set of unique first virtual tokens are stored as identification details;
  generating, by the tokenization component, a common virtual payment token;
  storing the common virtual payment token in the table on the consumer database by linking the identification details with the common virtual payment token;
  transmitting the common virtual payment token to the consumer electronic device;
  linking the common virtual payment token to a digital wallet of the consumer electronic device;
  receiving, from an acquirer server of an acquirer financial institution for a merchant, transaction details and the common virtual payment token associated with the digital wallet of the consumer electronic device, the transaction details comprising details of the merchant;
  retrieving, by a data retrieval component of the server from the consumer database, the identification details;
  selecting, by a selection retrieval component of the server from the set of consumer payment instruments, the respective consumer payment instrument associated with the merchant based on a comparison between the identification details and the transaction details;

retrieving, by the data retrieval component from the consumer database, the payment details of the selected respective consumer payment instrument; and communicating, to an issuer server of an issuer financial institution for the selected respective consumer payment instrument, the transaction details and the payment details of the selected respective consumer payment instrument.

2. The system according to claim 1, wherein the merchant details comprise a merchant identifier and one or more merchant category codes of the merchant, the selected respective consumer payment instrument being associated with one or more of the merchant identifier and the one or more merchant category codes.

3. The system according to claim 2, wherein each respective consumer payment instrument is selectable based on one or more of the merchant identifier and the one or more merchant category codes of the merchant.

4. The system according to claim 1, the steps further comprising receiving, from one or more issuer financial institutions, details of one or more promotional offers.

5. The system according to claim 4, wherein the details of each promotional offer comprise one or more of the following: (i) details of eligible merchants in the promotional offer, (ii) details of eligible consumer payment instruments in the promotional offer, and (iii) a duration of the promotional offer.

6. The system according to claim 5, the steps further comprising verifying the details of eligible consumer payment instruments against the consumer database.

7. The system according to claim 4, the steps further comprising updating the consumer database with the details of the promotional offers.

8. The system according to claim 1, wherein each respective consumer payment instrument is selectable based on one or more of the associated selectable merchant identifiers and selectable merchant category codes.

9. A computerized method, the method performed by a server coupled to a consumer database, the method comprising:

communicating, to a consumer electronic device, one or more of a set of selectable merchant identifiers and a set of selectable merchant category codes;

receiving, from the consumer electronic device, registration details of a set of consumer payment instruments, the registration details including, for each respective consumer payment instrument of the set of consumer payment instruments, payment details for the respective consumer payment instrument and a selection of one or more of the selectable merchant identifiers and the selectable merchant category codes to be associated with the respective consumer payment instrument;

generating, by a tokenization component of the server, a set of unique first virtual tokens respectively for the set of consumer payment instruments;

creating a table on the consumer database;

storing the registration details and the set of unique first virtual tokens in the table on the consumer database by linking each of the respective consumer payment instruments with a respective one of the unique first virtual tokens, wherein the registration details and the set of unique first virtual tokens are stored as identification details;

generating, by the tokenization component, a common virtual payment token;

storing the common virtual payment token in the table on the consumer database by linking the identification details with the common virtual payment token;

transmitting the common virtual payment token to the consumer electronic device;

linking the common virtual payment token to a digital wallet of the consumer electronic device;

receiving, from an acquirer server of an acquirer financial institution for a merchant, transaction details and the common virtual payment token associated with the digital wallet of the consumer electronic device, the transaction details comprising details of the merchant;

retrieving, by a data retrieval component of the server from the consumer database, the identification details;

selecting, by a selection retrieval component of the server from the set of consumer payment instruments, the respective consumer payment instrument associated with the merchant based on a comparison between the identification details and the transaction details;

retrieving, by the data retrieval component from the consumer database, the payment details of the selected respective consumer payment instrument; and communicating, to an issuer server of an issuer financial institution for the selected respective consumer payment instrument, the transaction details and the payment details of the selected respective consumer payment instrument.

10. The method according to claim 9, wherein the merchant details comprise a merchant identifier and one or more merchant category codes of the merchant, the selected respective consumer payment instrument being associated with one or more of the merchant identifier and the one or more merchant category codes.

11. The method according to claim 10, wherein each respective consumer payment instrument is selectable based on one or more of the merchant identifier and the one or more merchant category codes of the merchant.

12. The method according to claim 9, the steps further comprising receiving, from one or more issuer financial institutions, details of one or more promotional offers.

13. The method according to claim 12, wherein the details of each promotional offer comprise one or more of the following: (i) details of eligible merchants in the promotional offer, (ii) details of eligible consumer payment instruments in the promotional offer, and (iii) a duration of the promotional offer.

14. The system according to claim 13, the steps further comprising verifying the details of eligible consumer payment instruments against the consumer database.

15. The system according to claim 14, the steps further comprising updating the consumer database with the details of the promotional offer.

16. A non-transitory computer-readable storage medium storing computer-readable instructions that, when executed, cause a server to perform steps of a method according to claim 9.

* * * * *